Oct. 15, 1935.  J. C. FISHER  2,017,752
HOLDDOWN DEVICE FOR AUTOMATIC SHEARING MACHINES
Filed Feb. 27, 1934  3 Sheets-Sheet 1
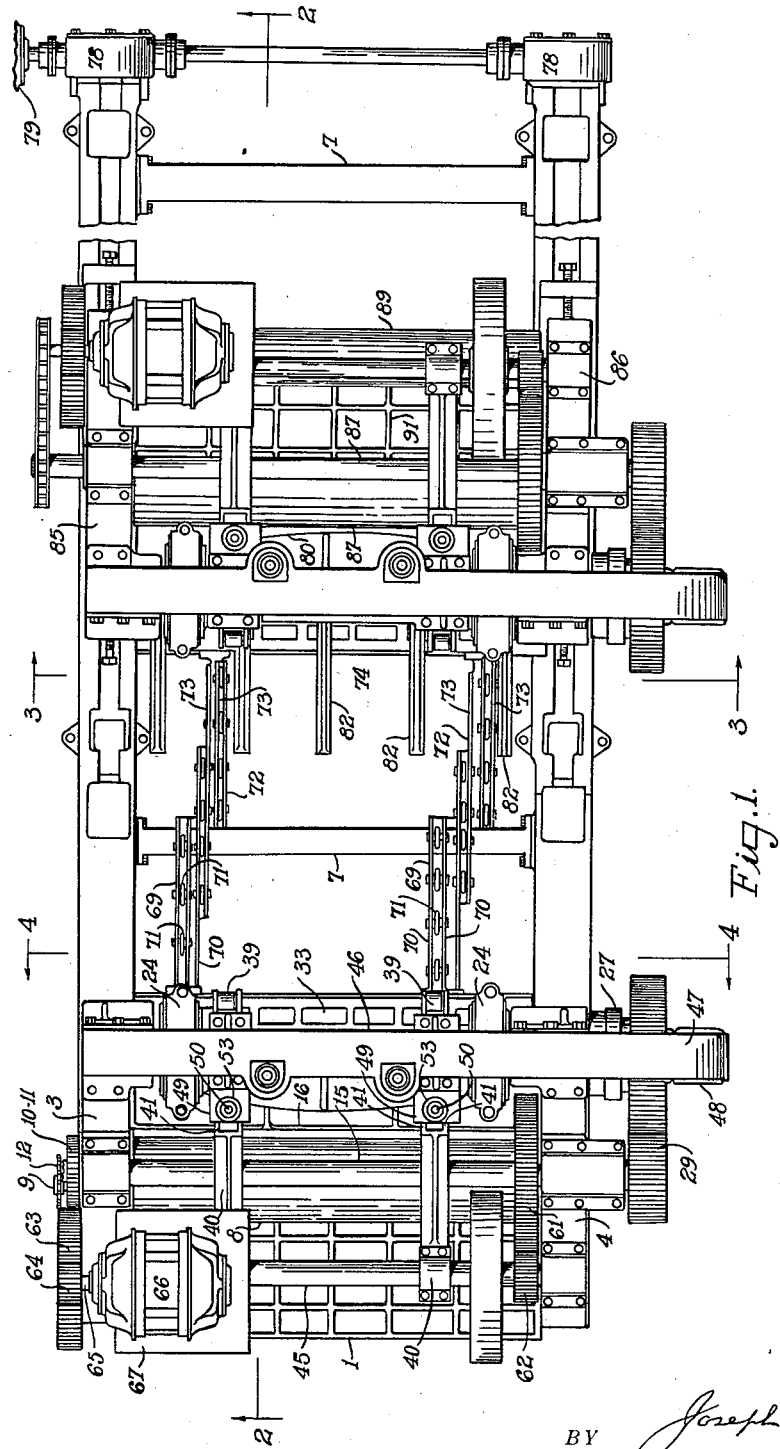
INVENTOR,
Joseph C. Fisher,
BY Howard D. Smith,
His ATTORNEY

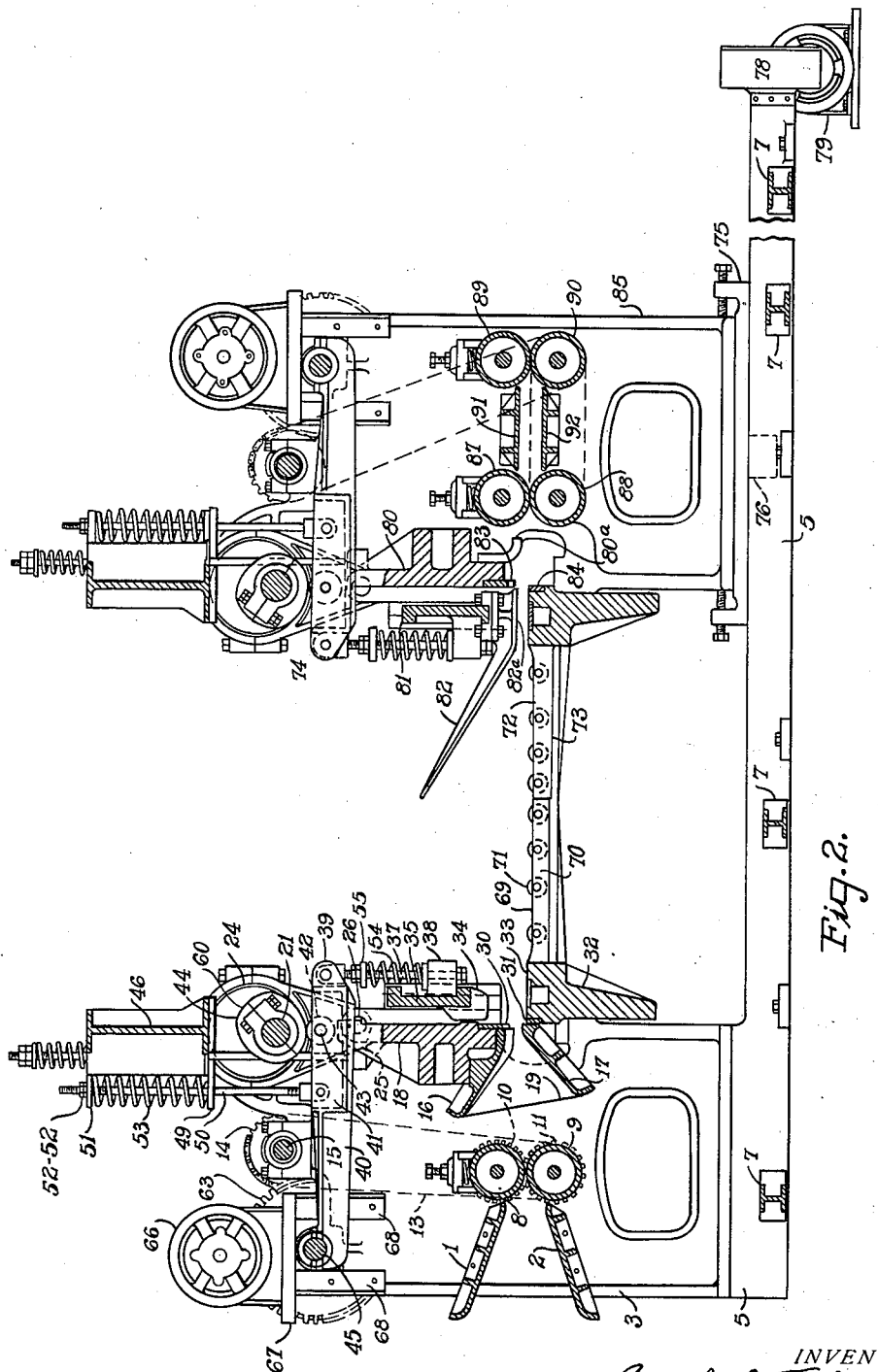

Oct. 15, 1935.  J. C. FISHER  2,017,752
HOLDDOWN DEVICE FOR AUTOMATIC SHEARING MACHINES
Filed Feb. 27, 1934  3 Sheets-Sheet 3
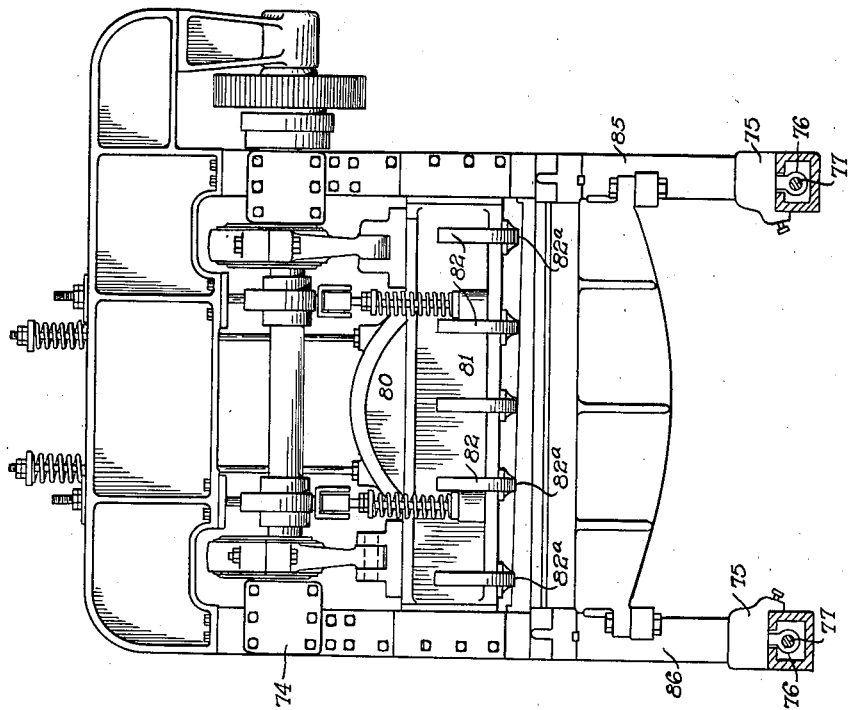
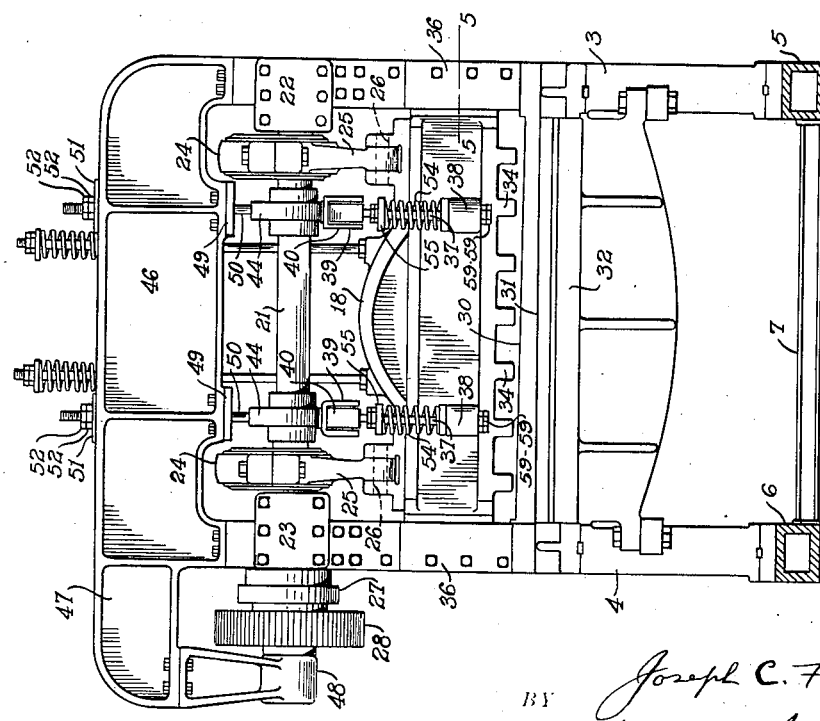
INVENTOR
Joseph C. Fisher.
BY Howard S. Smith,
ATTORNEY Patented Oct. 15, 1935

2,017,752

UNITED STATES PATENT OFFICE 2,017,752

HOLDDOWN DEVICE FOR AUTOMATIC SHEARING MACHINES

Joseph C. Fisher, St. Marys, Ohio, assignor to The Streine Tool and Manufacturing Company, New Bremen, Ohio, a corporation of Ohio Application February 27, 1934, Serial No. 713,157

1 Claim. (Cl. 164—51)

This invention relates to new and useful improvements in holddown devices for automatic shearing machines.

It is one of the principal objects of the invention to provide hold-down means that co-act with the end shears of continuous automatic shearing machines for flattening out the ends of the sheets or packs as they are presented to the end cutting shears, and more particularly to rear hold-down members that are also formed to act as guides for the leading ends of the sheets.

It is another object of the invention to provide means for protecting the front shear blades from injury by the advancing sheets or packs.

Another object of my invention is the provision of roller means at the rear of the machine to flex the edge-trimmed sheets sufficiently to assist in breaking their adhesion to each other.

The invention may be embodied in machines that vary in form and structure, as, for instance, in simple hand-fed shears or in machines for continuously and automatically shearing sheets and packs of different sizes and thicknesses of metal. This latter type of machine is more fully described in the following specification in connection with the accompanying drawings.

In these drawings, Figure 1 is a top plan view of the complete, continuous, automatic end shearing machine. Figure 2 is a longitudinal, sectional view taken through the machine on the line 2—2 of Figure 1. Figure 3 is a transverse sectional view taken through the machine on the line 3—3 of Figure 1, showing the end shear for the curl or front edge of the sheets. Figure 4 is also a transverse sectional view through the machine, taken on the line 4—4 of Figure 1 and showing the end shear for the trailing edge of the sheets. And Figure 5 is a detail sectional view taken on the line 5—5 of Figure 4 and showing the slideways.

In the form of construction illustrated in the drawings, the sheets are fed from either a table or continuous automatic side shearing machine (not shown) between upper and lower transverse guides 1 and 2, secured at their flanged ends to vertical side frames 3 and 4. These side frames are secured in spaced relation upon bottom longitudinal rails 5 and 6, connected by transverse brace members 7 and forming a base for the device.

Immediately behind the converging ends of the guides 1 and 2 are co-acting upper and lower transverse feed rollers 8 and 9, whose axial projections are journalled in the side frames 3 and 4. Beyond the side frame 3 there is secured to these axial projections, mating gears 10 and 11. On a projection of the roller 9 there is a sprocket 12 which is driven by a sprocket chain 13 from a sprocket 14 on a transverse shaft 15 journalled in bearings mounted on the side frames. (See Figures 1 and 2.)

After passage between the feed rollers 8 and 9 the sheet or pack is delivered to upper and lower converging shear guides 16 and 17 movable with a vertically actuated cutter bar 18 to which they are attached. The guides 16 and 17 are provided with end closures 19, by which the lower guide 17 is supported by the upper guide 16.

The cutter bar 18 is slidably mounted in oppositely disposed slideways formed by slide plates 20—20 bolted to the rear faces of the side frames 3 and 4. (See Figure 5.) Above the cutter bar 18 there is a transverse eccentric shaft 21 journalled in bearings 22 and 23 attached to the tops of the respective side frames 3 and 4. (See Figures 1, 2 and 4.)

Keyed to the shaft 21, adjacent each bearing 22 and 23 is an eccentric 24, whose lower end 25 is pivotally connected by a pin 26 with the cutter bar 18.

Beyond the frame 4 there is mounted on the shaft 21 a conventional shear clutch 27 whose free side is connected with a gear 28 freely mounted on the shaft 21 and driven by a pinion 29 keyed to the projecting end of the shaft 15.

Now, when the shear clutch 27 is tripped, the eccentric shaft 21 will make one complete revolution to rotate the eccentrics 24—24 to reciprocate the cutter bar 18. (See Figure 4.)

Secured to the lower edge of the cutter bar 18, and on the side thereof opposite the guides 16 and 17, is a cutter blade 30 which co-acts in shearing action with a stationary blade 31 mounted on a lower stationary bar 32 that extends transversely between the side frames 3 and 4 to which it is bolted.

Behind the blade 31 the stationary bar 32 has a flat horizontal face 33 over which the pack passes before the shearing operation, and in contact with which the pack or sheets are firmly held by hold-down fingers 34 to prevent the buckling and bowing of the sheets. These fingers, latterally spaced, are on the blade side of the cutter bar 18 and depend from a transverse hold-down bar 35. This bar is vertically reciprocated in slots formed by offset plates 36, 36, secured to the end frames 3 and 4 over the plates 20, 20, and is suspended by spaced rods 37, 37, whose lower ends pass through apertured bosses 38, 38 on the face of the bar. The upper ends of these rods are pivotally secured in the outer forked ends 39, 39 of spaced, fulcrumed cam follower arms 40, 40. (See Figures 4 and 5.)

Adjacent its free end, each cam follower arm 40 is formed with spaced sides 41 between which there is freely mounted on a roller stud 42, a cam roller 43 that engages a hold-down cam 44 secured to the shaft 21. At its fulcrumed end each arm 40 is pivotally mounted on a transverse countershaft 45 whose ends are journalled in bearings formed in the side frames 3 and 4.

Extending between the side frames 3 and 4, above the shaft 21, is a cross head 46 secured to the former and having an outboard extension 47 beyond the side frame 4. Depending from this extension is an outboard bearing 48 in which the outer end of the shaft 21 is journalled. Between the bearing 48 and the bearing 23 the gear 28 and clutch 27 is mounted on the shaft 21. (See Figure 4.)

Intermediate the side frames the cross head 46 is substantially I shaped in cross-section, and above each arm 40 there is connected with the lower flange of the cross head a rearwardly projecting apertured plate 49. Passing through each apertured plate 49 is a vertical rod 50 whose lower end is pivotally secured between the spaced sides 41—41 of its respective arm 40.

Above the plate 49, each rod is threaded to receive thereon a thrust collar 51, retained by nuts 52, 52. Between the collar 51 and the plate 49, each rod 50 is surrounded by a helical compression spring 53 to support its respective arm 40 and hold its respective cam roller 42 in contact with the cam 44. (See Figures 2 and 4.)

Positioned on each link 37, between its boss 38 and its pivotally connected upper end, is a helical compression spring 54, whose upper end is engaged by a thrust collar 55 on a link 37 and held in an adjusted position by lock nuts above it.

Below the boss 38, nuts 59, 59 are applied to the lower end of the rod. Now, as the shaft is rotated, the eccentrics 24 and cams 44 will rotate with it. The cam 44, due to its advanced position, will cause the hold-down fingers 34 to descend before the cutter bar 18, to firmly press the sheets or plate to be sheared against the smooth flat surface 33 of the lower cutter bar 32. When the sheets or plate are thus held by the fingers 34, free from buckling or bulges, the shear blades 30 and 31 will accurately and cleanly shear them.

When the hold-down fingers 34 are firmly pressed against the sheets or plate, and cannot descend further, the continued descent of the cam follower arms 40, 40 will cause a compression of the springs 54, 54, thus maintaining a continuous pressure during the downward stroke of the cutter bar. These fingers also serve as strippers during the initial upward travel of the cutter bar 18.

In order to retain the hold-down fingers 34 in the "down" position during the shearing operation a concentric surface or dwell 60 is provided on each cam, against which the roller 42 bears during the shearing time.

Keyed or otherwise secured to the shaft 15, adjacent the side frame 4, is a gear 61 which meshes with a pinion 62 keyed to the shaft 45. This shaft beyond the side frame 3, has keyed thereto a gear 63 that meshes with a pinion 64 attached to the shaft 65 of a motor 66. The latter is attached to a sub-base 67 supported by bracket members 68, 68 above the frames 3 and 4. (See Figure 2.)

When the tin packs or sheets are delivered by the feed rollers 3 and 4 to the cutter blades, they are supported upon a cantilevered roller bed 69 projecting from the lower cutter bar 32. This roller bed 69, consisting of spaced horizontal bars 70 between which rollers 71 are freely mounted, is telescopically received by another roller bed 72. The horizontal bars 73 of this roller bed 72 are staggered in relation to the bars 70, and like the latter, are supported from the lower cutter bar of another end shear 74, to trim the front or curl edges of the tin packs or sheets when their trailing edges stop beneath the first shear.

In general arrangement the end shear 74 is similar to the one previously described, and, as shown in Figure 2, is positioned opposite to it and upon adjustable bed shoes 75, 75. These shoes are slidably positioned on the bottom rails 5 and 6, and have beneath them depending lugs 76, 76 that project through open slots in the tops of the rails. Extending axially of the rails are threaded shafts 77, 77 that are received by the lugs 76, 76 respectively. At the rear end of each rail, each shaft has secured thereto a right angled, worm gear drive 78 actuated by a reversible motor 79. When this motor is rotated in one direction, the shoes 75, 75 will be moved over the rails toward the first shear, and away from the latter when the motor is rotated in the opposite direction, thereby regulating the spacing between the respective shears in accordance with the length to which it is desired to shear the two packs or sheets positioned upon the roller beds between them. (See Figure 2.)

The shear 74, positioned opposite the first shear, is similar thereto. Independently reciprocable along the face of its cutter blades 80, is a hold-down bar 81 to whose lower flanged edge there are secured upwardly inclined guide arms 82, spaced transversely of the bar like the fingers 34. These guide arms direct the leading ends of the sheets to positions where they will be held against horizontal movement by the hold-down bar 81 until the rear shearing operation has been completed. Each guide arm 82 beneath the hold-down bar 81, is formed with a flat horizontal surface 82ᵃ which, like the fingers 34 when the bar is forced down, will hold the front or curl edge of the tin pack or sheet smoothly after the latter has been guided into position by said arms.

Beyond the upper and lower cutter bars 83 and 84 of this shear, there is positioned between its side frames 85 and 86, a front pair of co-acting upper and lower transverse delivery rollers 87 and 88 whose axial projections are journalled in the side frames 85 and 86. (See Figures 1, 2 and 3.) The advancing sheet or packs are further guided toward the rolls 87, 88 by a series of spaced curved guide shoes 80ᵃ carried by the bar 80.

At the rear of these delivery rollers is another pair of like delivery rollers 89 and 90, likewise having axial projections journalled in the side frames. Between the pairs of delivery rollers 85, 86 and 89, 90, there are upper and lower stationary guide plates 91 and 92 which are secured to and extend from side frame to side frame.

When the packs pass through delivery rollers 87, 88, 89 and 90, the sheets are flexed sufficiently to assist in automatically breaking their adhesion to each other.

When a sheet or tin pack is presented or delivered to the guides 1 and 2, it is moved by the rollers 8 and 9 between the upper and lower cutter bars 18 and 32 of the first shear, and then along the extensible roller beds 69 and 72 until its front or curl edge is received between the upper and lower cutter bars 83 and 84 of the shear 74.

The trailing edge of the sheet or pack will now be positioned between the cutter bars 18 and 32 of the first shear. (See Figures 1 and 2.)

When the respective shear clutches are tripped, the movable cutter bars 18 and 83 will descend simultaneously. As previously stated, the hold-down bars 35 and 81 will descend ahead of their respective cutter bars, due to the advanced angular positions of their cams and the hold-down fingers 34, and the guide arms 82 will firmly hold the sheets or tin packs smoothly without buckles or bulges during the shearing operation. After the shearing operation, when the cutter blades have risen clear of the sheets, the hold-down means will release them, whereupon the sheets will be guided through the rear rollers 87, 88, 89 and 90 which will flex them sufficiently to assist in breaking their adhesion to each other.

It will be observed that I have provided means to protect the cutting edge of the front shear blades 30 and 31 from injury by the advancing sheet or packs. The upper guide 16, attached to the bar 18, depends slightly below the latter to protect the blade 30 and facilitate the entry of the sheet or pack below it.

As previously set forth, the converging guides 16 and 17 are movable with the cutter bar 18. Now, when the latter is in its "up" position the lower guide will be raised until its rearward edge is above the blade 31, as shown in Figure 2. When in this position the advancing sheet or packs will pass over the blade 31.

As the cutter bar 18 descends, the guides 16 and 17 will also descend to permit the upper blade 30 to engage the lower blade 31.

I do not wish to be limited to the details of construction and arrangement herein shown and described, and any changes or alterations may be made therein within the scope of the subjoined claim.

Having described my invention, I claim:

In a machine for shearing sheet material, a shear, a vertically reciprocable cutter blade for said shear, a hold-down bar vertically reciprocable along the face of said cutter blade, and upwardly inclined guide arms secured to the under surface of said hold-down bar to guide the sheets to positions under said bar without interfering with the free flow of said sheets through the machine, the portions of said guide arms under the hold-down bar being flat to hold the front edges of the sheets smoothly and firmly after the latter have been guided into shearing position by said arms.

JOSEPH C. FISHER.